(12) United States Patent
Ozaki (10) Patent No.: US 8,220,620 B2
(45) Date of Patent: Jul. 17, 2012

(54) LOAD-CARRYING CONVEYOR CHAIN

(75) Inventor: Hajime Ozaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 104 days.

(21) Appl. No.: 12/913,831

(22) Filed: Oct. 28, 2010

(65) Prior Publication Data
US 2011/0100785 A1 May 5, 2011

(30) Foreign Application Priority Data

Nov. 4, 2009 (JP) ................................. 2009-253036

(51) Int. Cl.
*B65G 17/06* (2006.01)
(52) U.S. Cl. ........................................ 198/851; 198/850
(58) Field of Classification Search .................. 198/850, 198/851, 853
See application file for complete search history.

(56) References Cited

U.S. PATENT DOCUMENTS

| 3,685,637 | A | * | 8/1972 | Bildsoe | 198/850 |
| 4,893,709 | A | * | 1/1990 | Schroeder et al. | 198/852 |
| 5,803,236 | A | * | 9/1998 | Wahren | 198/852 |
| 6,247,583 | B1 | * | 6/2001 | Coen et al. | 198/852 |
| 6,736,259 | B1 | * | 5/2004 | Funabashi | 198/852 |
| 6,779,652 | B2 | * | 8/2004 | Baier et al. | 198/831 |
| 7,044,290 | B2 | * | 5/2006 | Garbagnati et al. | 198/852 |
| 7,530,454 | B2 | * | 5/2009 | Neely et al. | 198/853 |
| 2001/0030112 | A1 | | 10/2001 | Tanabe | |

FOREIGN PATENT DOCUMENTS

| JP | 2001-213506 | 8/2001 |
| JP | 2001-289285 | 10/2001 |

* cited by examiner

*Primary Examiner* — James R Bidwell
(74) *Attorney, Agent, or Firm* — Dann, Dorfman, Herrell & Skillman; Henry H. Skillman (57) ABSTRACT

The invention provides a load-carrying conveyor chain that can be bent backward, realizing spatial three-dimensional conveyance, and can be hooked deeply by sprocket teeth, thus rarely causing jump of the teeth. The chain is constructed by endlessly connecting link bodies each having a head composed of a hollow cylindrical portion defined by walls having elongated pin holes extending circumferentially of the cylindrical portion, and a pair of legs respectively having pin holes by inserting a rotatable bearing body having a through pin hole into the cylindrical portion and by inserting connecting pins into the pin holes of the legs, the elongated pin holes of the head and the through pin hole of the bearing body while disposing the head of one link between the pair of legs of the contiguous other link. One end of the bearing body is extended to project out of the cylindrical portion and the bearing body has a flange at the projecting end.

12 Claims, 14 Drawing Sheets

PRIOR ART

FIG. 14

PRIOR ART

FIG. 15

PRIOR ART

LOAD-CARRYING CONVEYOR CHAIN

CROSS REFERENCE TO RELATED APPLICATION

This application claims the foreign priority benefit under Title 35, United States Code, §119 (a)-(d) of Japanese Patent Application No. 2009-253036, filed Nov. 4, 2009.

FIELD OF THE INVENTION

The present invention relates to a load-carrying conveyor chain used for conveying bottles, cans, foods, medicines and other objects in food and medicine-related industries and in industries in general and more specifically to a load-carrying conveyor chain used by circulating through curved paths.

BACKGROUND OF THE INVENTION

Heretofore, load-carrying conveyor chains used by circulating through curved paths are known.

Figure 13:
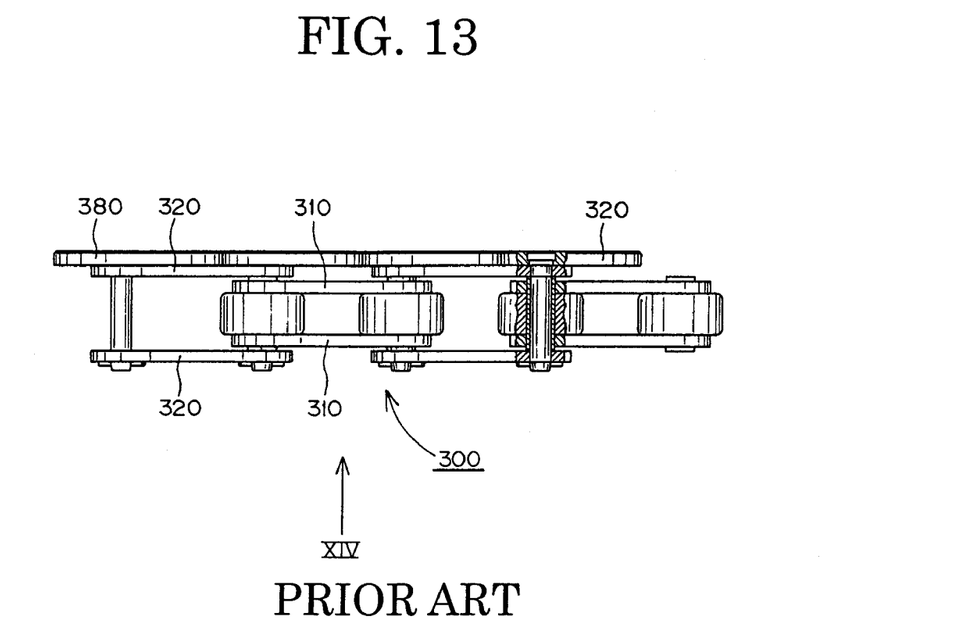
FIG. 13 is a side view of a prior art horizontal driving chain.
Figure 14:
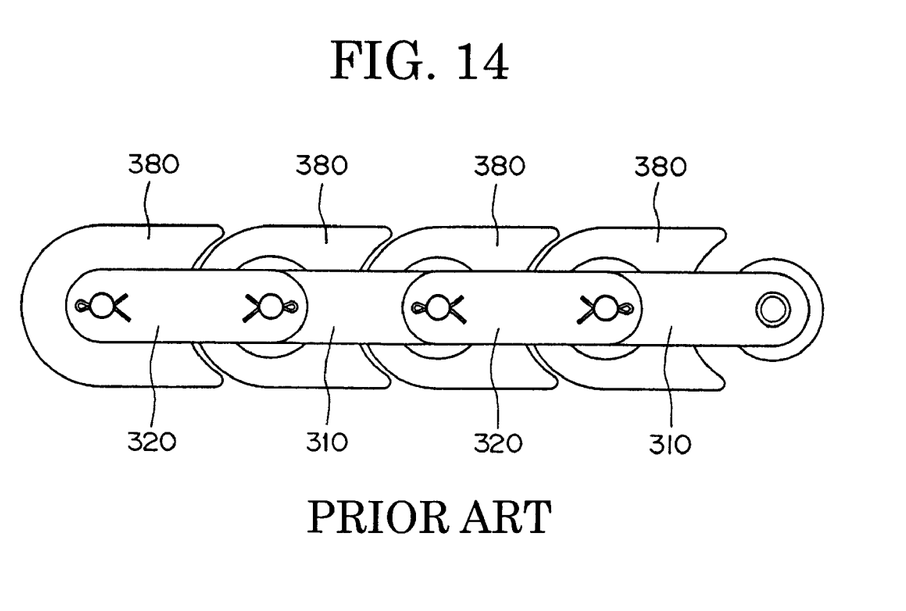
FIG. 14 is a bottom view when the horizontal driving chain in FIG. 13 is seen from the direction of the arrow XIV in FIG. 13.

For example in Japanese Patent No. 3580415, there has been known a so-called horizontal driving chain 300 in which top plates 380 are attached in parallel to outer and inner link plates 320 and 310 as shown in FIGS. 13 and 14. FIG. 14 is an inverted plan view of the chain when the chain in FIG. 13 is seen from the direction of an arrow XIV. The horizontal driving chain 300, whose top plates 380 are molded from engineering plastics, is often used as a carrying conveyor chain in sushi-go-round restaurants.

Figure 15:
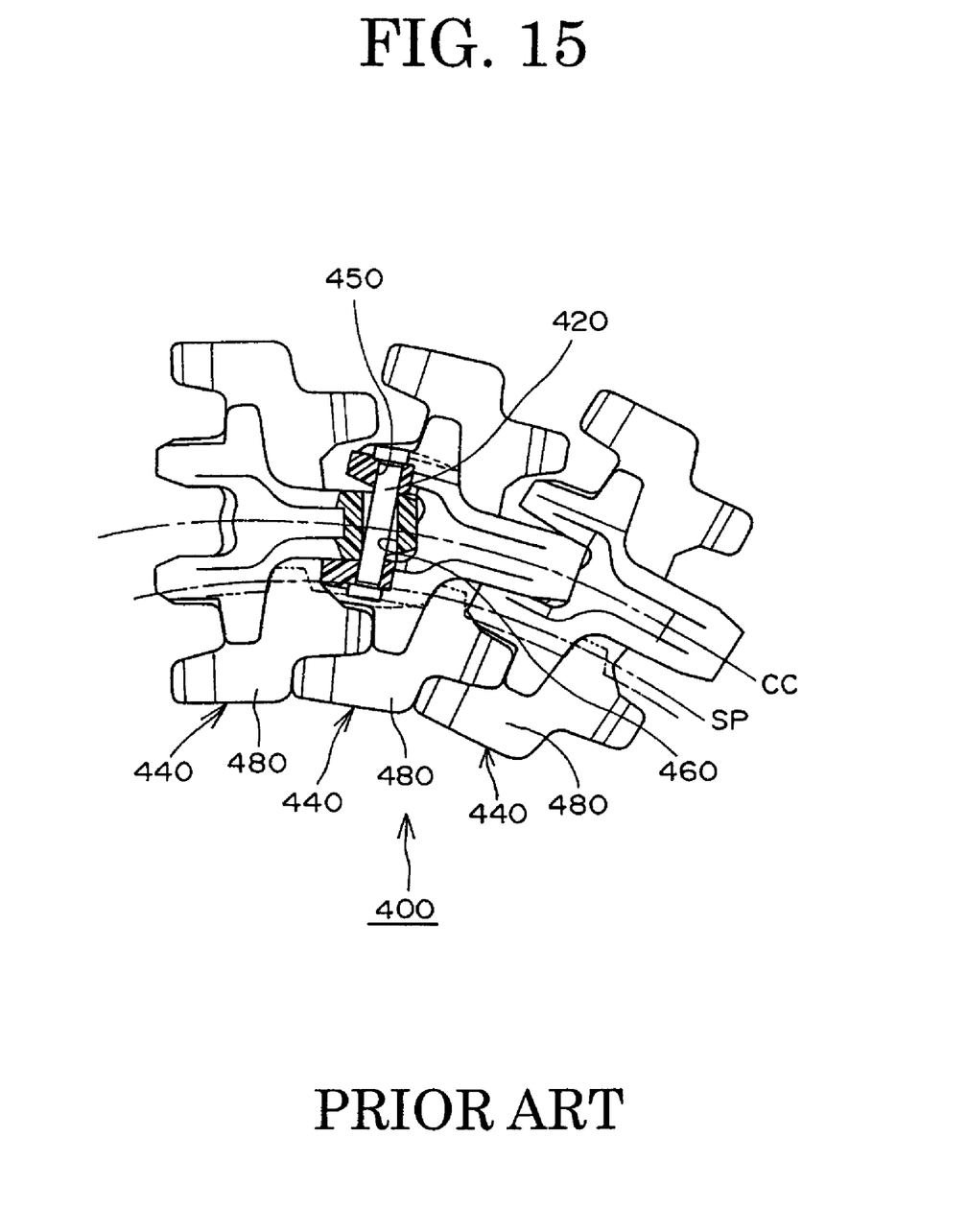
FIG. 15 is a bottom view of another a prior art chain with a portion broken away to show the loose fit of the pins in the bush holes.

There has been also known in Japanese Patent No. 3398110 a top chain 400 in which front and back portions of each top plate 480 are formed into comb-like concave and convex shapes as shown in FIG. 15, which is an inverted plan view of the top chain 400. A bush hole 460 in a rear portion of each link 440 of the top chain 400 is enlarged so as to be wide-opened in an axial direction so that the chain can be used even in a curved track of the conveying path. The contiguous links 440 are allowed to be angled to each other in the horizontal direction when pins 420 are inserted into the pin holes 450 and the bush holes 460 by aligning pin holes 450 in the front portion of the one link with bush holes 460 in the rear portion of the contiguous link.

However, the horizontal driving chain 300 as described above has a problem that because it cannot bend in the vertical direction with respect to the top plates 380, i.e., it cannot be bent backward, from its structure, it is unsuitable for carrying objects horizontally elongated a conveying path having three-dimensional spatial bends in the vertical direction on its way.

Meanwhile, the top chain 400 as described above has a problem that because an orbit where the teeth of a sprocket engage in receptacles in the bush-corresponding portion of each link 440 below the top plate 480, i.e., a pitch circle of the sprocket SP, is considerably closer to the center of rotation of the sprocket from the center of rotation than the pitch circle of the chain CC (when seen above), hooking of teeth of the sprocket is shallow and the teeth tend to jump.

SUMMARY OF THE INVENTION

Accordingly, the present invention aims at solving the aforementioned prior art problems by providing a load-carrying conveyor chain that can be bent backward, realizing three-dimensional spatial conveyance, and which is deeply hooked by sprocket teeth, thus rarely causing jump of the teeth.

In order to solve the aforementioned problems, a first embodiment of the invention aims at providing a load-carrying conveyor chain, having:
- a series of contiguous links each having a top plate and a link body provided under the top plate and having a head portion composed of a hollow substantially cylindrical portion which has elongated pin holes in its hollow walls through which a connecting pin is to be penetrated, and a tail portion having pair of legs extended from the walls of the head portion in the chain longitudinal direction and respectively having circular pin holes;
- substantially cylindrical bearing bodies each having a through pin hole; the bearing body being rotatably inserted into the hollow substantially cylindrical portion of the head portion to form a bearing section;
- the connecting pins each of whose both ends are inserted into the circular pin holes of the pair of legs of one link, while penetrating through the elongated pin holes of the head portion of the contiguous other link, and the pin through hole of the bearing body in a state in which the head portion formed in the contiguous other link is disposed between the pair of legs of the one link to connect the links endlessly and to form the load-carrying conveyor chain;
- one end of the bearing body being formed so as to project out of the substantially cylindrical portion of the head portion and the bearing body has a flange formed at the projecting end.

A second embodiment of the invention aims at solving the aforementioned problem by providing the link with a slat whose width is wider than that of the link body as a top plate.

In addition, the second embodiment of the invention aims at solving the aforementioned problem by arranging such that the slat is formed into a comb-like shape so that the slat interdigitates with slats of the contiguous front and rear links.

The load-carrying conveyor chain of the first embodiment of the invention has such advantageous effects that because the load-carrying conveyor chain is formed by endlessly connecting the links each having the top plate and the link body provided under the top plate and having the head portion composed of the hollow substantially cylindrical portion having the elongated pin holes and a tail portion having a pair of legs extended from the head portion in the chain longitudinal direction and respectively having the pin holes by inserting the substantially cylindrical bearing bodies each having the through pin hole rotatably into the substantially cylindrical portion of the head portion and by inserting the connecting pins into the pin holes of the pair of legs, the elongated pin holes which extend circumferentially of the head portion and the through pin hole of the bearing body in the state in which the head portion formed in one link is disposed between the pair of legs in the tail portion of the contiguous other link, the links may turn in the vertical direction centering on the connecting pins and the connecting pins may move horizontally within the elongated pin holes of the head portion. Accordingly, the contiguous links are allowed to bend in the up and down and in the horizontal directions from each other, so that the load-carrying conveyor chain of the invention can bend backward and can realize the spatial three-dimensional conveyance. In addition to that, the chain of the invention brings about the following remarkable effects corresponding to the peculiar structure thereof.

That is, the load-carrying conveyor chain of the first embodiment of the invention has such an advantageous effect that because one end of the bearing body is formed so as to project out of the substantially cylindrical portion of the head portion and the bearing body has the flange formed at the projecting end, the chain engages with the sprocket so that the sprocket teeth fit into the spaces in the chain between the projecting parts of the bearing bodies, and the side surfaces of the sprocket teeth slidably contact with the upper surfaces of the flanges of the bearing bodies so as to suppress the chain from floating up. Accordingly, it becomes possible to realize the load-carrying conveyor chain which is deeply hooked by the sprocket teeth and which rarely causes the teeth to jump out of the spaces in the chain.

Still more, it becomes possible to smoothly guide the chain in its entire travel while it is bending up and down and in both the horizontal and vertical directions and to exhibit excellent conveying performances by providing guide rails so as to slidably contact with the projecting elongated of the bearing body along the conveying path of the load-carrying conveyor chain as described later.

The load-carrying conveyor chain of the second embodiment of the invention has an additional advantageous effect that because the link has the slat whose width is wider than that of the link body as the top plate, a contact area of the top plate with a carried object becomes large. Accordingly, it becomes possible to convey the carried object in a stable position.

The load-carrying conveyor chain of the second embodiment of the invention has such a still further advantageous effect that because the slat is formed into the comb-like shape so that the slat has fingers which interdigitate with corresponding fingers of the slats of both contiguous links in the front and to the rear. This interdigitation prevents a large gap from being made between the front and rear top plates even if the chain bends in the horizontal direction. Accordingly, it becomes possible to steadily convey objects in a stable position in the horizontally bending track without being caught by a gap made between the top plates and without falling down even if the objects to be conveyed are vertically long cans and bottles.

BEST MODES FOR CARRYING OUT THE INVENTION

A specific mode of a load-carrying conveyor chain of the present invention may take any mode as long as the load-carrying conveyor chain is formed by endlessly connecting links each composed of a top plate and a link body provided under the top plate and having a head portion composed of a hollow substantially cylindrical portion having elongated pin holes and a tail portion having a pair of legs extended from the head portion in the chain longitudinal direction and respectively having cylindrical pin holes by inserting substantially cylindrical bearing bodies each having a through pin hole rotatably into the substantially cylindrical portion of the head portion and by inserting connecting pins into the pin holes of the pair of legs, the elongated pin holes of the head portion and the through pin hole of the bearing body in a state in which the head portion formed in one link is disposed between the pair of legs in the tail portion of the contiguous other link, one end of the bearing body is formed so as to project out of the cylindrical portion of the head portion and the bearing body has a flange formed at the projecting end, and the load-carrying conveyor chain can be bent backwardly, realizing spatial conveyance, and can be hooked deeply by sprocket teeth, thus rarely causing jump of the teeth.

For example, the load-carrying conveyor chain of the invention may be arranged such that the link body is integrally molded with the top plate by synthetic resin such as engineering plastic or such that the link body and the top plate are formed as separate members and are fixed by means of bonding, screwing and the like.

First Embodiment

Figure 1:
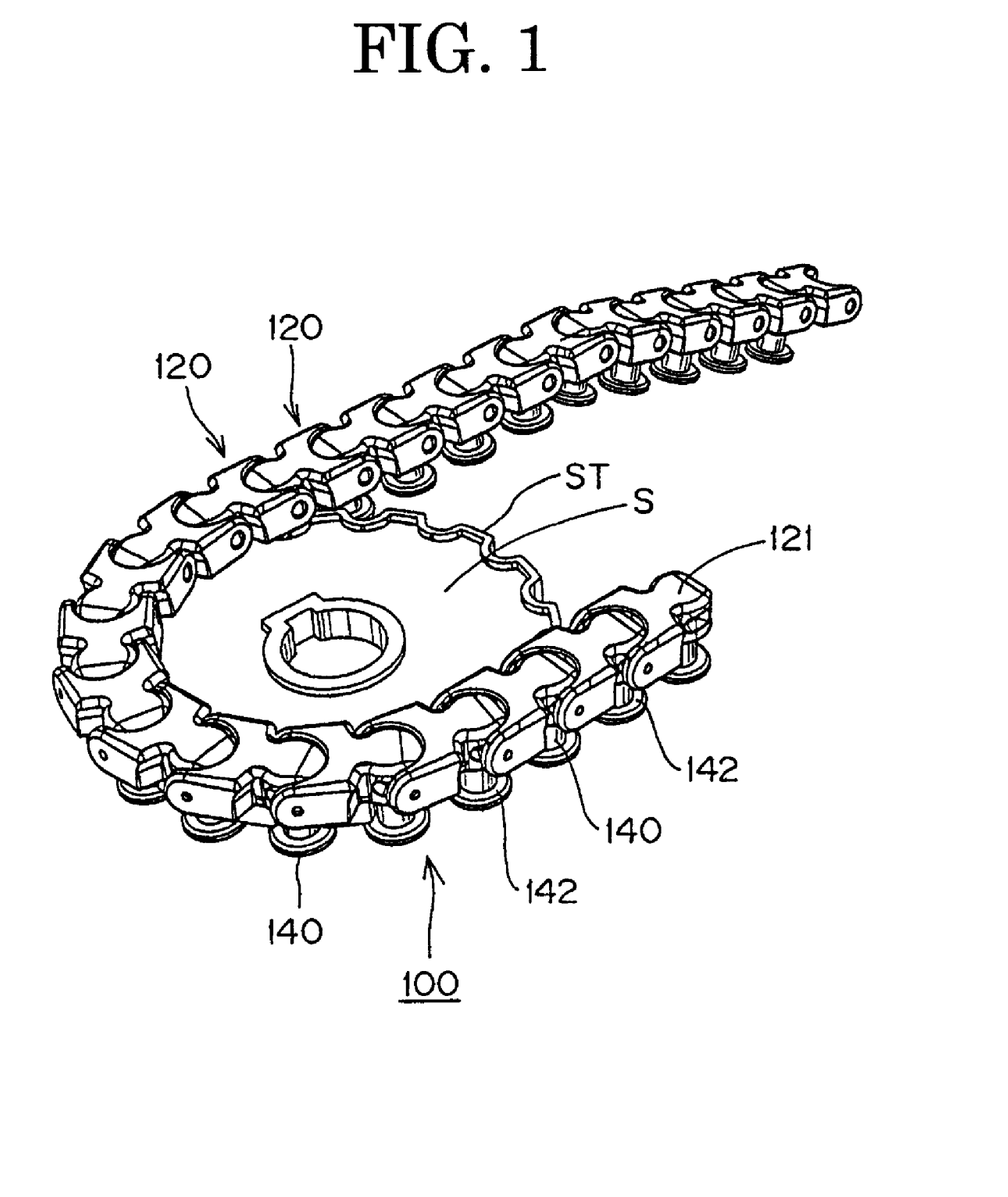
FIG. 1 is a fragmentary perspective view of a turning section of a load-carrying conveyor chain of a first embodiment as seen from above.

A first embodiment of the load-carrying conveyor chain of the invention will be explained with reference to FIGS. 1 through 9. As shown in FIG. 1, a chain 100 is composed of a series of contiguous links 120 (shown in FIGS. 3-5) interconnected by connecting pins 130. The chain 100 turns horizontally as the projecting ends of bearing bodies 140, described later, engage with teeth ST of a sprocket S. The conveyor chain 100 of the present embodiment is an universal type load-carrying conveyor chain capable of traveling while bending along a three-dimensional travel line in straight, up and down and right and left directions.

Figure 3:
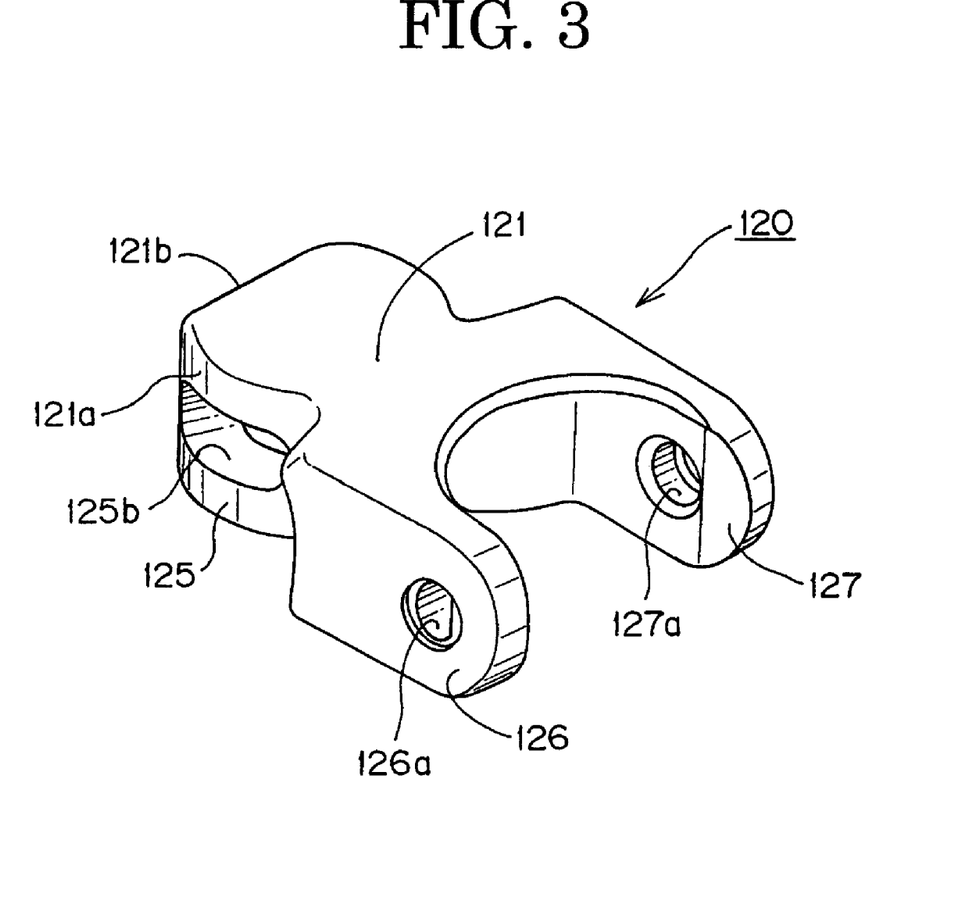
FIG. 3 is a perspective view of a link of the load-carrying conveyor chain of the first embodiment.
Figure 4:
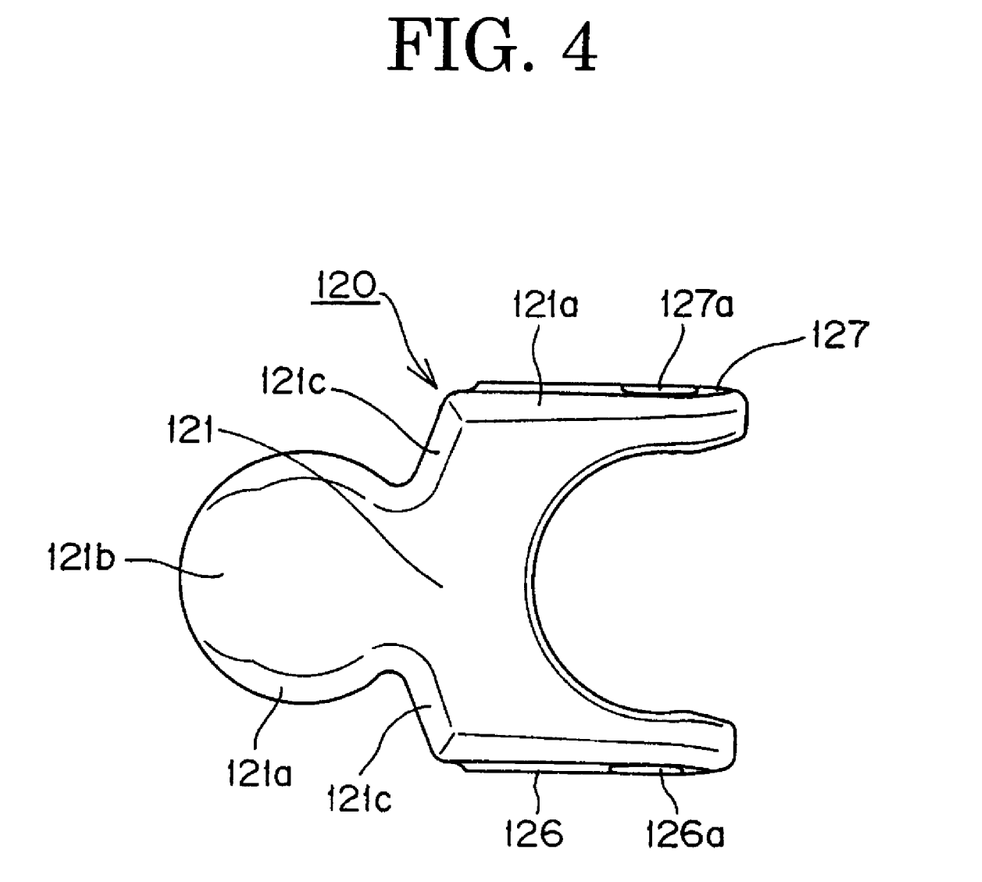
FIG. 4 is an top plan view of the link of the load-carrying conveyor chain of the first embodiment.
Figure 5:
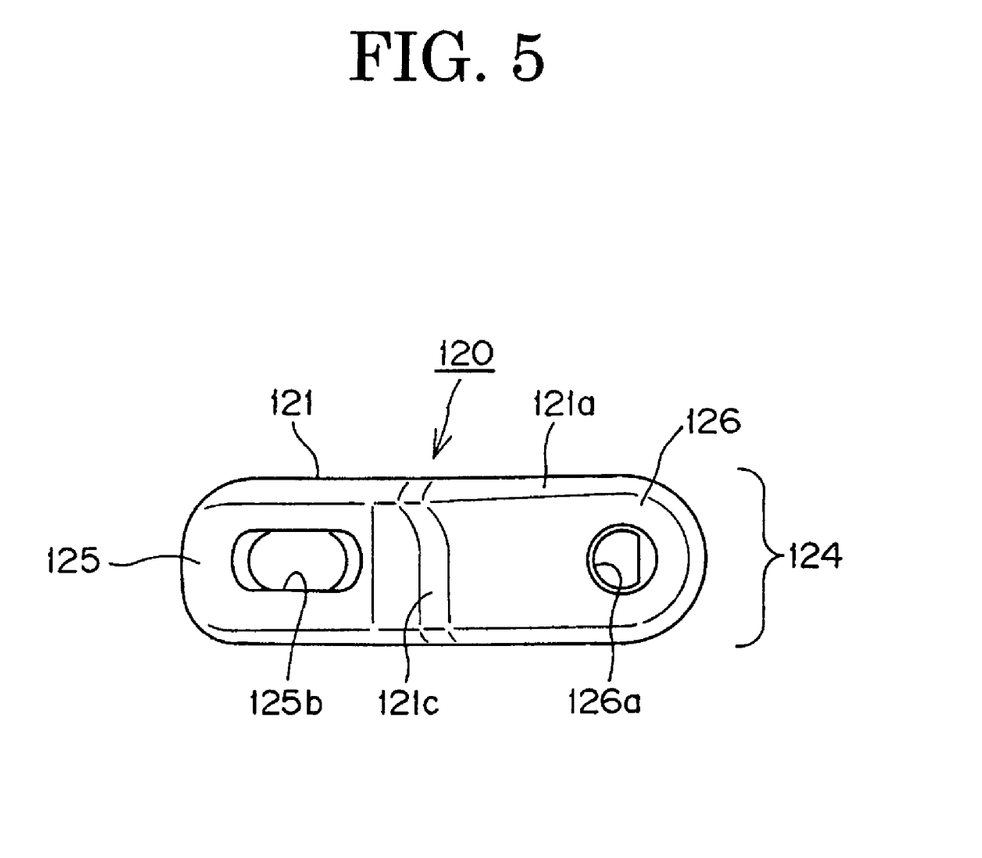
FIG. 5 is a side view of the link of the load-carrying conveyor chain of the first embodiment.

As shown in FIGS. 3 through 5, each link 120 has a top plate 121 on which a carried object is placed and a link body 124 provided under the top plate 121. The link 120 of the present embodiment is molded monolithically from a synthetic resin.

Figure 6:
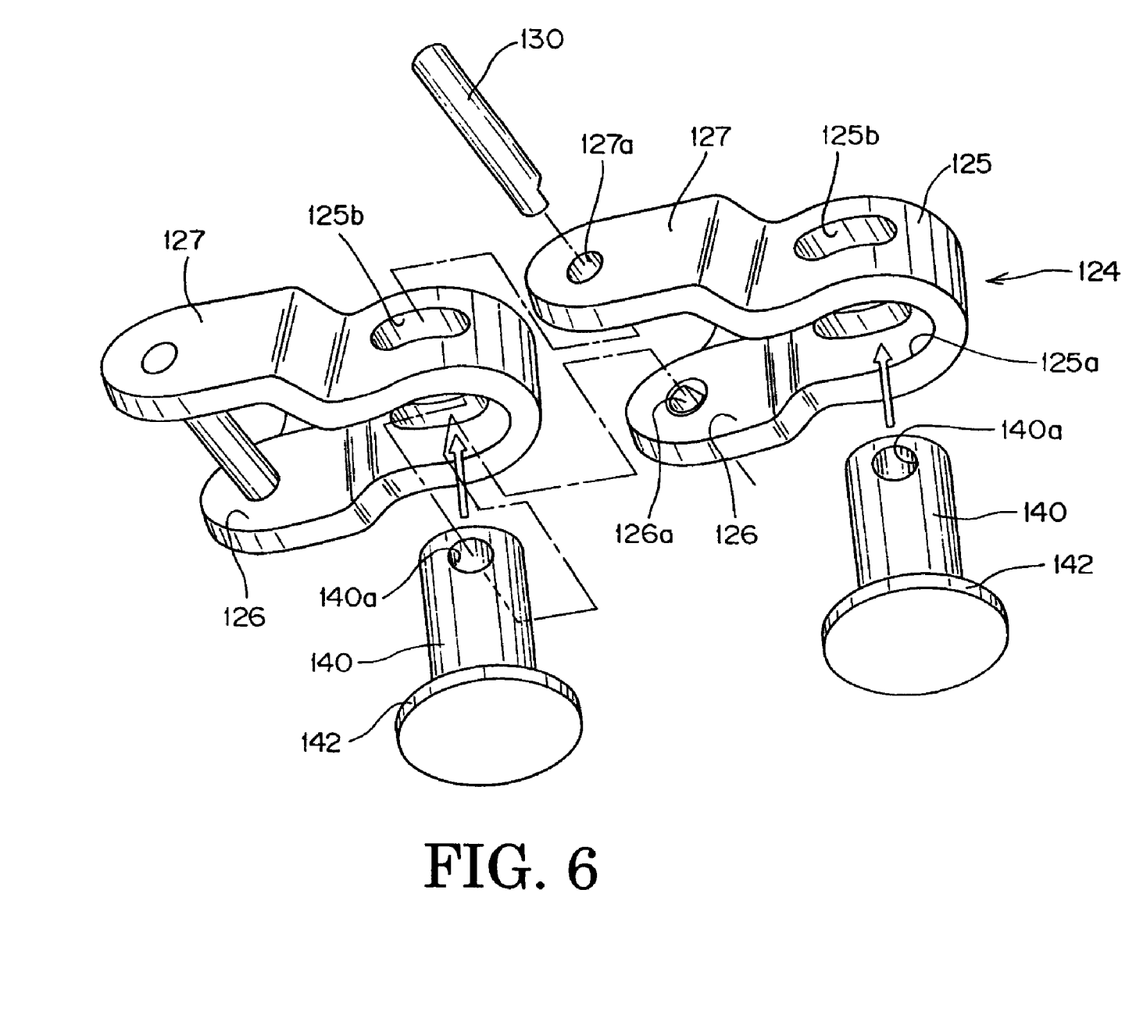
FIG. 6 is an exploded perspective view illustrating a connection of two links composing the load-carrying conveyor chain of the first embodiment.
Figure 7:
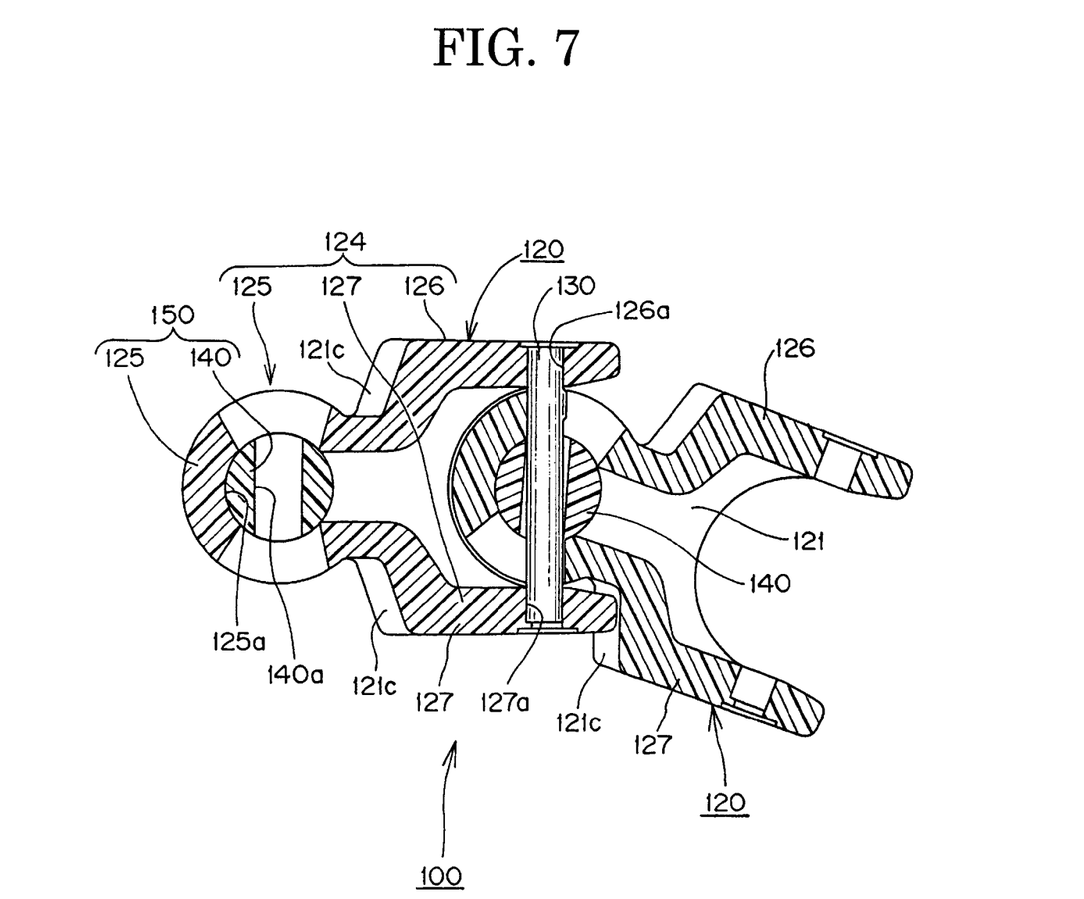
FIG. 7 is a section view illustrating a state in which the load-carrying conveyor chain of the first embodiment travels while bending horizontally.

As shown in FIGS. 6 and 7, the link body 124 has a hollow substantially cylindrical head portion 125 having a cylindrical bearing body hole 125a into which a bearing body 140 is attached and a tail portion having a pair of legs 126 and 127 extended from the head portion 125 in the chain longitudinal direction. The head portion 125 and the bearing body 140 combine to form a bearing section 150 for the chain.

An elongated pin hole 125b through which the connecting pin 130 is penetrated through a substantially cylindrical wall around the substantially cylindrical hole 125a of the head portion 125. The legs 126 and 127 are also provided with pin holes 126a and 127a which are cylindrical through which the connecting pin 130 is inserted. The pin holes are aligned with a horizontal axis in the tail portion.

The bearing body 140 has a substantially cylindrical shaft, for connecting the links 120, that is longer than a height of the link 120 to provide a projecting portion with a length substantially equal to the thickness of teeth of the sprocket. The shaft terminates in a flange 142 at one end thereof. The bearing body 140 is rotatable in the substantially cylindrical hole 125a of the head portion 125. The bearing body 140 freely rotates in the hole 125a, centering on the center vertical axis of the hole 125a (see FIG. 7). Within the hole 125a, the bearing body 140 has a circular through pin hole 140a into which the connecting pin 130 is loosely fitted as shown in FIGS. 6 and 7.

The load-carrying conveyor chain 100 may be assembled by connecting the links 120 as described above. That is, the links 120 may be connected endlessly by inserting the bearing body 140 first into the substantially cylindrical hole 125a of the head portion 125 of each link 120 and, while positioning the head portion 125 of one link 120 between the pair of legs 126 and 127 of a contiguous link 120, and inserting the connecting pin 130 between the legs, i.e., through the pin hole 126a of the leg 126, the two elongated pin holes 125b of the contiguous link 120, the through pin hole 140a of the bearing body 140 and the pin hole 127a of the leg 127. It is noted that the elongated pin holes 125b extend circumferentially of the hollow cylindrical hole 125a, so as to permit limited rotation of the bearing body 140 about the vertical axis.

Figure 2:
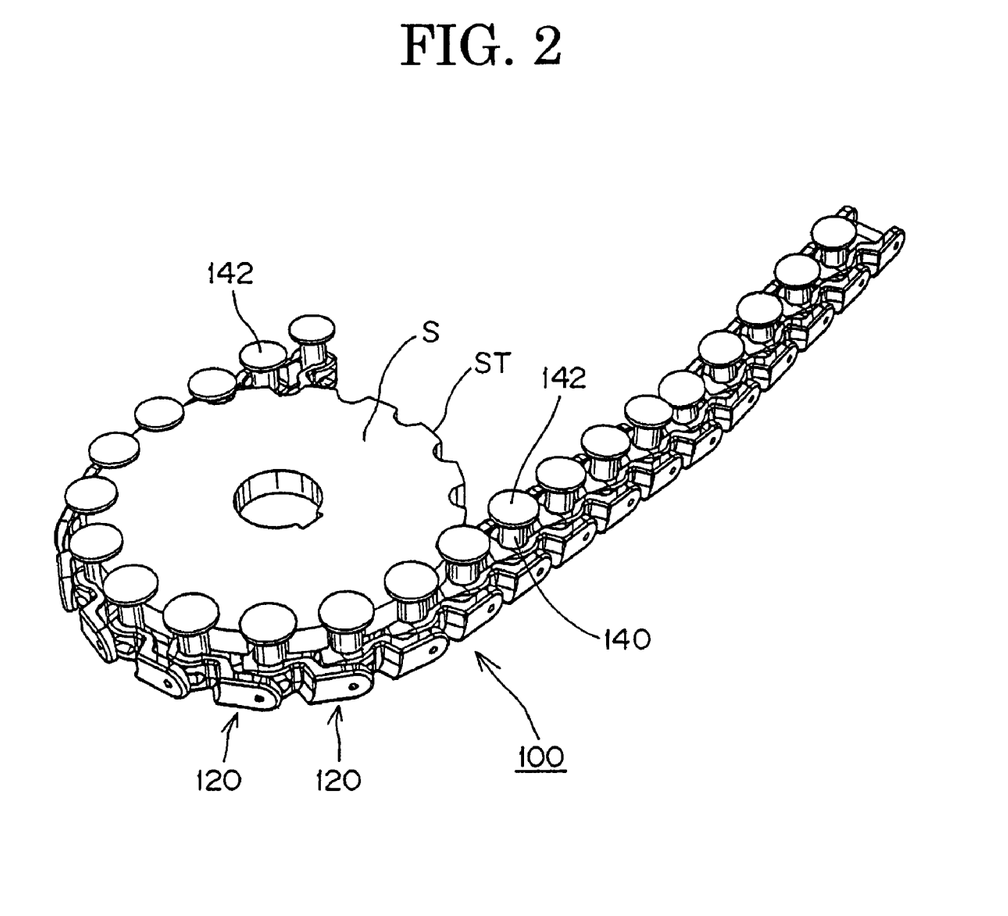
FIG. 2 is a fragmentary perspective view similar to FIG. 1 of the turning section, as seen from below.

The load-carrying conveyor chain 100 of the first embodiment constructed as described above turns horizontally as it is suspended so that the lower projecting portions of the bearing body shaft 140 engage in tooth grooves of the sprocket S as shown in FIGS. 1 and 2. As a result, the teeth ST of the sprocket S engage in the spaces between the projecting portions of the shafts of the bearing bodies, and the center line of the load-carrying conveyor chain 100 coincides with a pitch circle of the sprocket S, causing the load-carrying conveyor chain 100 to be hooked deeply by the sprocket teeth ST, and which rarely causes the teeth to jump out of the spaces between the projecting portions of the shafts. Still more, because the flange 142 formed at the lower projecting end of the bearing body 140 slidably contacts with the tooth underside surface of the sprocket S, the load-carrying conveyor chain 100 will not float up and can convey carried objects in a stable condition even if the chain turns in high speed.

Figure 8:
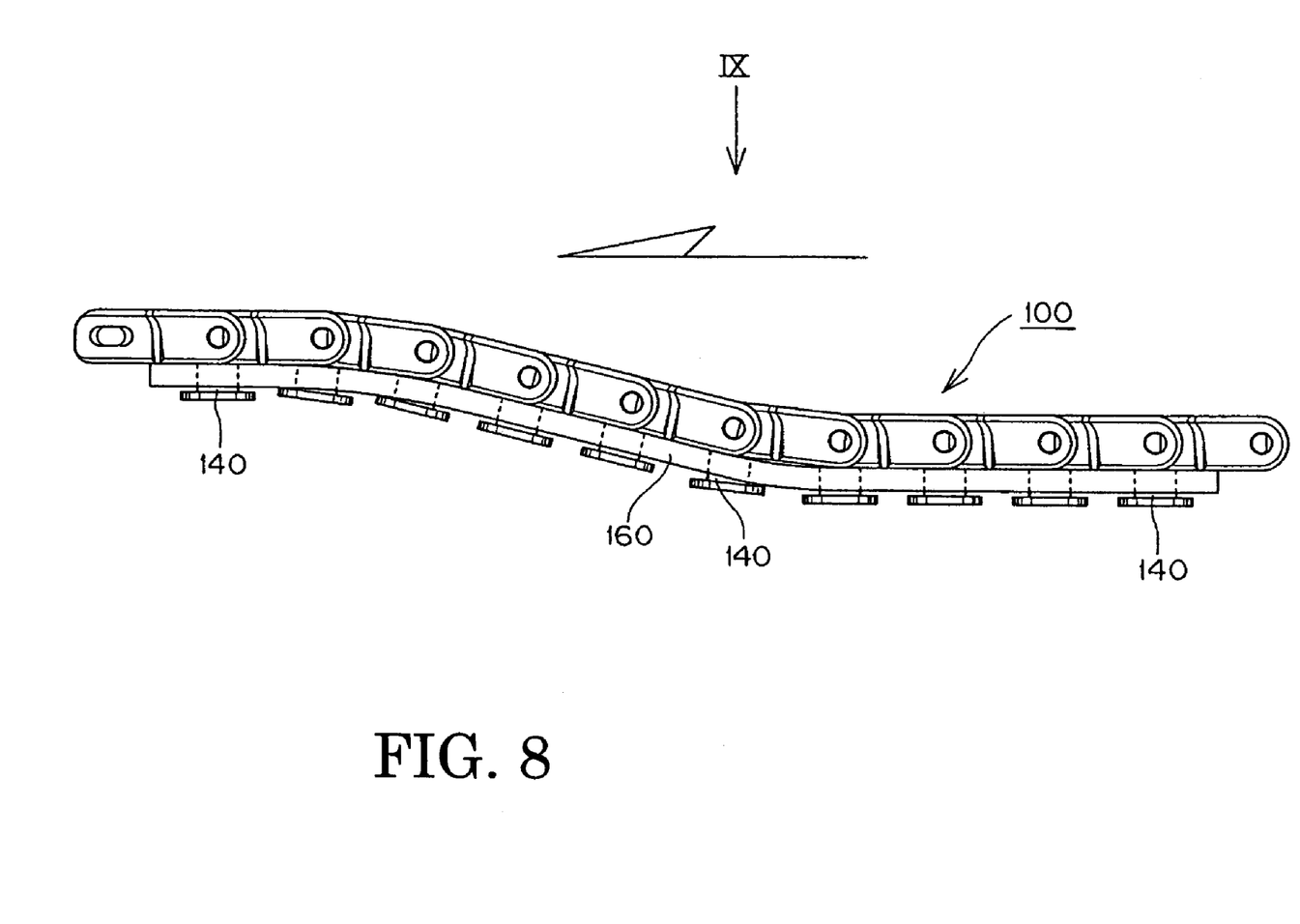
FIG. 8 is a side view illustrating a state in which the load-carrying conveyor chain of the first embodiment travels while bending vertically.
Figure 9:
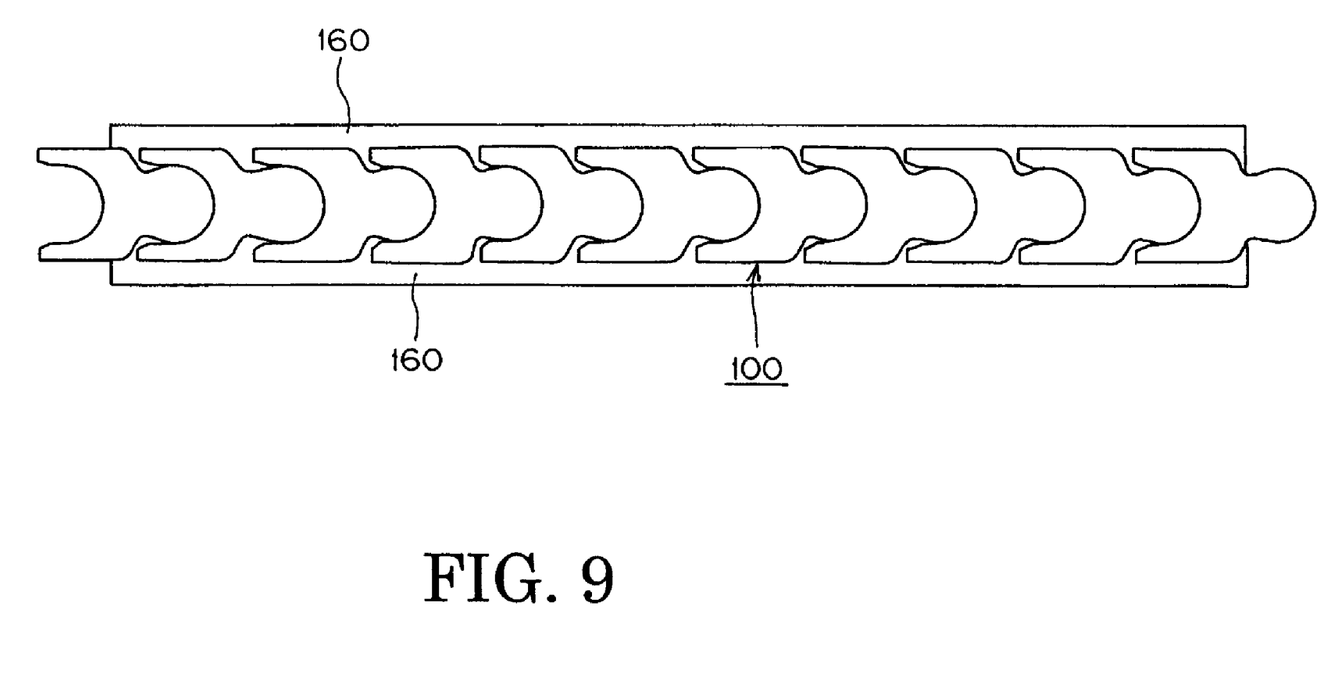
FIG. 9 is a top plan view of the load-carrying conveyor chain shown in FIG. 8, as seen from the direction of the arrow IX in FIG. 8.

Still more, as shown in FIGS. 8 and 9, a desirable vertically bending track may be realized by providing guide rails 160 that vertically bend in parallel with the load-carrying conveyor chain in a case of intersecting a plurality load-carrying conveyor chains in a return path of the conveying paths for example.

Second Embodiment

Figure 11:
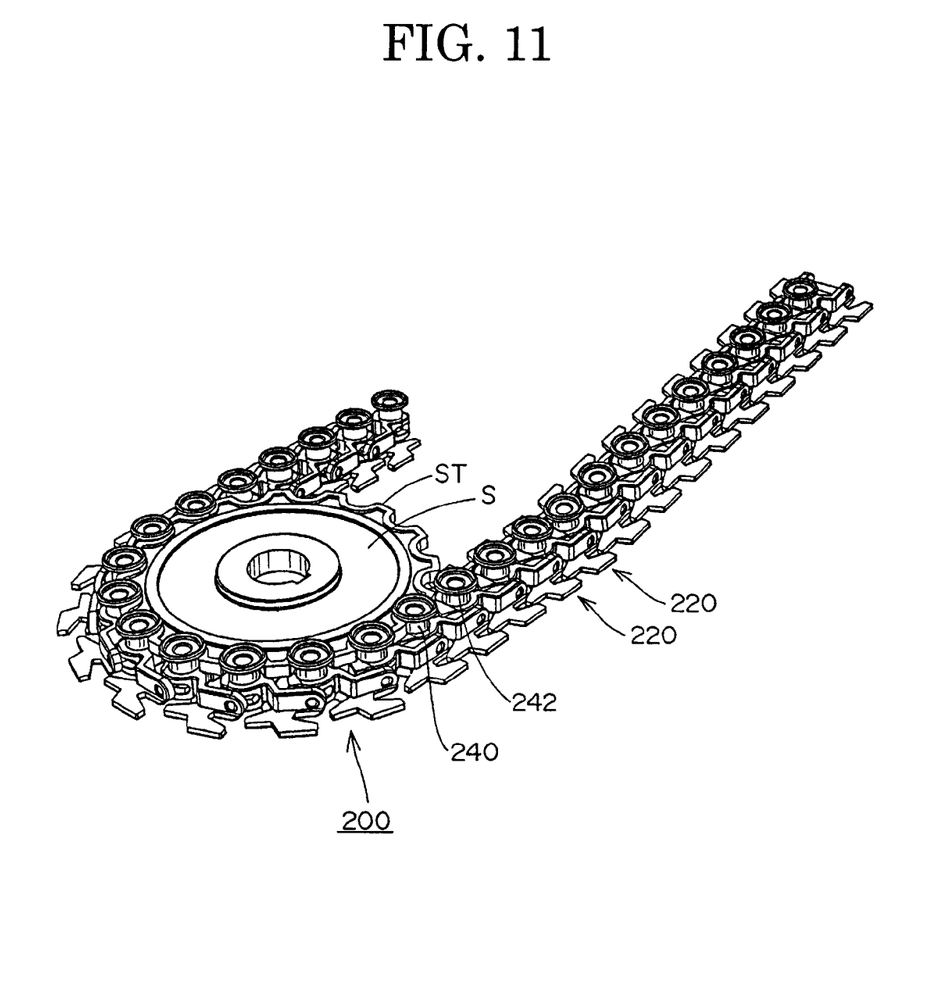
FIG. 11 is a fragmentary perspective view similar to FIG. 10 of the turning section of the load-carrying conveyor chain of the second embodiment, as seen from below.
Figure 12:
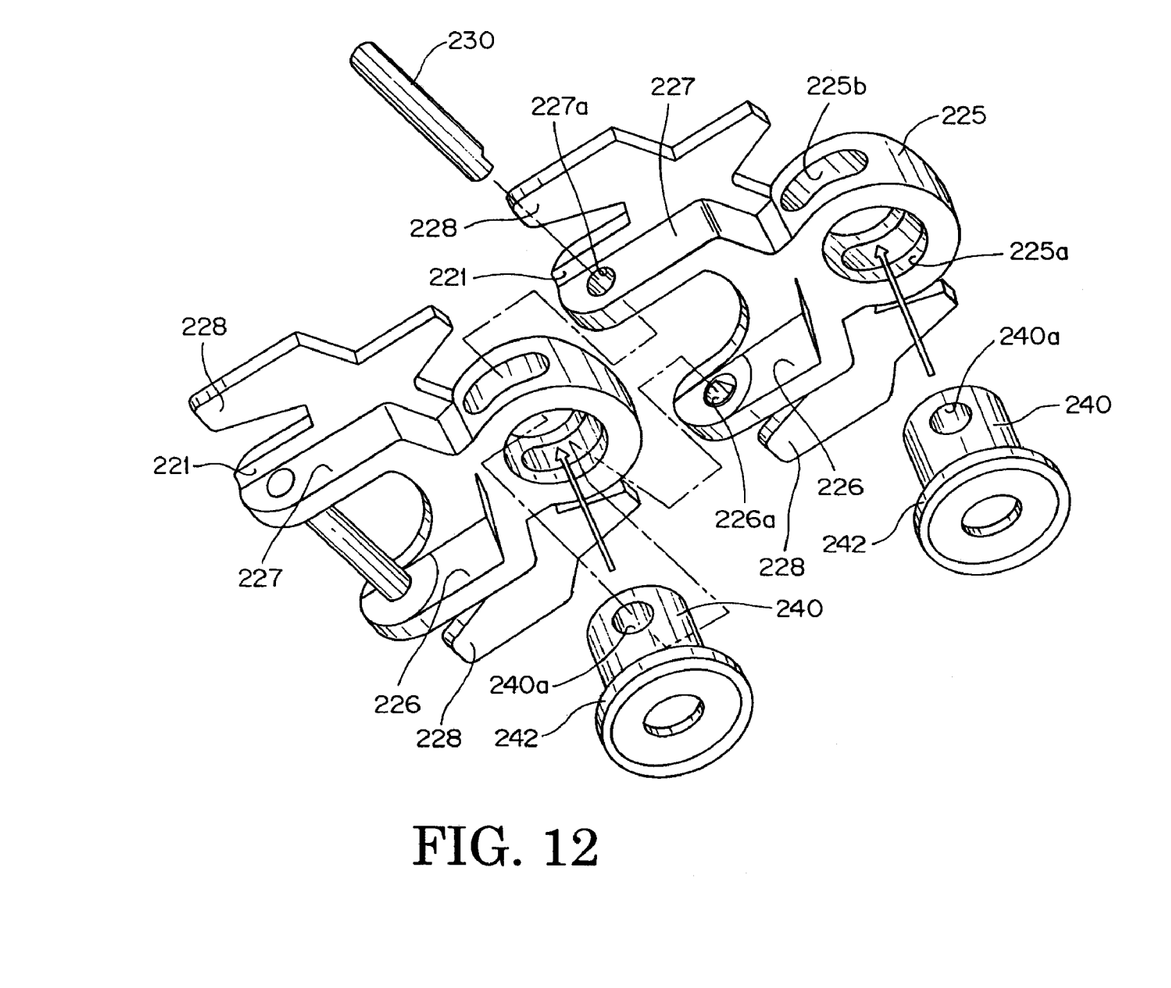
FIG. 12 is an exploded perspective view illustrating a connection of two links of the second embodiment.

Next, a load-carrying conveyor chain 200 of a second embodiment of the invention, will be explained with reference to FIGS. 10 through 12.

The basic system structure of the load-carrying conveyor chain 200 of the second embodiment is totally the same as the load-carrying conveyor chain 100 of the first embodiment, except of the shape of top plates 220, so that an explanation of the same or corresponding parts thereof will be omitted here by using reference numerals from 200 through 242 for the parts which correspond to parts 100 through 142.

The load-carrying conveyor chain 200 of the second embodiment turns horizontally as the projecting shaft portions of bearing bodies 240 engage between the teeth ST of the sprocket S. FIG. 12 is an exploded perspective view illustrating the procedure for connecting two contiguous links of the load-carrying conveyor chain 200 of the second embodiment.

The link body composing the link has a head portion 225 and tail portion 227 substantially the same as the head portion 125 and tail portion 127 of the load-carrying conveyor chain 100 of the first embodiment. However, the top plate 221 is in the form of a a slat whose width is wider than that of the tail portion 227 of the second embodiment as shown in FIG. 12. Then, the slat 221 has a comb-like shape so that it has fingers 228 which interdigitate with complementary fingers of the slats or the link plates on the contiguous links to the front and rear of the link 220.

Figure 10:
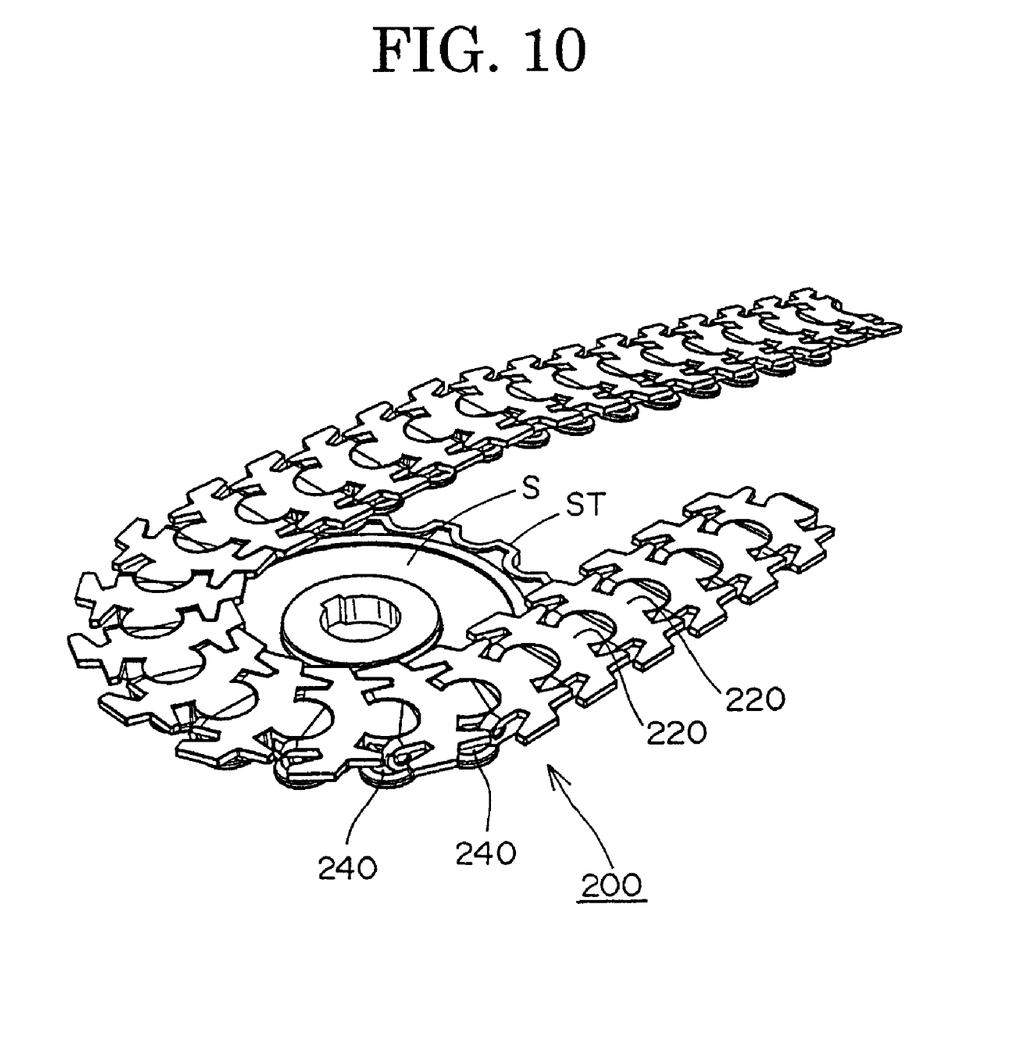
FIG. 10 is a fragmentary perspective view of a turning section of a second embodiment of a load-carrying conveyor chain as seen from above.

As shown in FIG. 10, the complementary fingers allow the chain to curve around the sprocket S without creating gaps between the front and rear links even if the chain travels while bending on a horizontal plane and can convey objects smoothly without causing such troubles that the object is caught in the gap between the links. The absence of gaps reduces the risk of the conveyed objects falling down even in conveying vertically long objects such as cans and bottles. FIG. 10 illustrates a preferred configuration of the complementary fingers in which the center finger at the leading edge of the slat has a semi-circular outline centered on the vertical axis of the head portion 225, and the complementary fingers at the trailing edge of the slat provide a semi-circular space centered on a vertical axis perpendicular to the horizontal axis of the tail portion 227.

As described above, the invention brings about the remarkable effects by realizing the load-carrying conveyor chain that can be bent backward, thus enabling the three-dimensional conveyance, and providing a conveyor chain which is hooked deeply by the sprocket teeth, thus rarely causing the sprocket teeth to jump out of the space between the projecting parts of the bearing body shafts.

The invention claimed is:
1. A load-carrying conveyor chain, comprising:
 a pair of contiguous links each having a top plate and a link body disposed under the top plate,
 said body of each link having a head portion comprising a side wall forming a hollow portion that is substantially cylindrical, said side wall having elongated pin holes, and a tail portion having a pair of legs extended from said head portion in the chain longitudinal direction, said legs respectively having pin holes;
 a bearing body in each link including a shaft rotatable within said hollow portion to form a bearing section,
 said shaft having a through hole adjacent one end thereof; and having the other end thereof projecting beyond said hollow portion, and
 a connecting pin extending through said pin holes of said pair of legs of one link, through said elongated pin holes of said head portion of the contiguous link, and through said through hole of said bearing body to retain said head portion formed in said contiguous link is disposed between the pair of legs of said one link to connect the pair of links to form a part of said load-carrying conveyor chain;

said projecting end of said bearing body terminating in a flange at the free end.

2. The load-carrying conveyor chain according to claim 1, wherein each of said links has a slat whose width is wider than that of the link body, said slat adapted to serve as the top plate for supporting the load.

3. The load-carrying conveyor chain according to claim 2, wherein said slat has a comb-like shape having fingers projecting toward the contiguous slats at both ends of said slat, so that the fingers of each of said slats interdigitate with fingers of the slats of the contiguous links to provide a continuous load-supporting surface without gaps between said contiguous links.

4. The load-carrying conveyor chain according to claim 1, wherein said elongated slots extend circumferentially of said substantially cylindrical hollow portion, such that said connecting pin is moved along the length of said elongated slot when said shaft rotates within said hollow portion.

5. The load-carrying conveyor chain according to claim 4, wherein said elongated slats are wider than the underling link portions, to provide a wide contact area for supporting the articles to be conveyed.

6. The load-carrying conveyor chain according to claim 1 for use with sprockets having teeth of a given thickness for driving said chain, wherein the projecting end of said shaft has a length between the hollow portion and the flange at least as long as the thickness of the sprocket teeth, so that the chain is advanced by the sprocket teeth engaging the projecting ends of the shafts between said flange and said hollow portion.

7. The load-carrying conveyor chain according to claim 6 including guide rails defining a three-dimensional path of movement for said chain, said guide rails being positioned between the sprockets and positioned to engage the projecting ends of the shafts between the said flange and said hollow portion.

8. A load-carrying conveyor chain operable to travel in a three-dimensional path, comprising:

a series of contiguous links each having a top plate and a link body disposed under the top plate, said body of each link having a head portion comprising a side wall forming a hollow portion that has a vertical axis in the center of the head portion, and a tail portion having a pair of legs extended from said head portion in the chain longitudinal direction, said legs being spaced apart to mount the head portion of a contiguous link of said series for pivotal movement on said horizontal axis;

a bearing body in each link including a shaft rotatable on said vertical axis within said hollow portion to form a bearing section, and having an upper end projecting above said head portion, and a lower end projecting below said head portion and terminating in a flange, said top plate comprising a slat whose width is wider than that of the link body, said slat adapted to serve as the top plate for supporting the load, said slat having a comb-like shape with fingers projecting toward the contiguous slats at both ends of said slat, so that the fingers of each of said slats interdigitate with fingers of the slats of the contiguous links to provide a continuous load-supporting surface without gaps between said contiguous links.

9. The load-carrying conveyor chain according to claim 8, wherein said fingers include a semi-circular finger centered in the vertical axis of said head portion, and a complementary semi-circular space centered on a second vertical axis perpendicular to the horizontal axis of said tail portion.

10. The load-carrying conveyor chain according to claim 8, wherein said head portion comprises a side wall forming a hollow portion that is substantially cylindrical about said vertical axis, said walls having elongated pin holes extending circumferentially thereof, and said bearing body comprising a shaft rotatable in said hollow portion, said link comprising a connecting pin passing through said legs, said elongated pin holes, and said bearing body shaft to mount said shaft for rotation on a vertical axis, and to mount said head portion for rotation on the horizontal axis of the tail portion of the contiguous link, said shaft rotation being limited by the length of said elongated pin holes.

11. The load-carrying conveyor chain according to claim 8 for use with sprockets having teeth of a given thickness for driving said chain, wherein the lower projecting end of said shaft has a length between the hollow portion and the flange at least as long as the thickness of the sprocket teeth, so that the chain is advanced by the sprocket teeth engaging the projecting ends of the shafts between said flange and said hollow portion.

12. The load-carrying conveyor chain according to claim 8 including guide rails defining said three-dimensional path of movement for said chain, said guide rails being positioned between the sprockets and positioned to engage the lower projecting ends of the shafts between the said flange and said hollow portion.

* * * * *